United States Patent
Iida et al.

(10) Patent No.: US 7,564,773 B2
(45) Date of Patent: Jul. 21, 2009

(54) OPTICAL DISK INCLUDING ADDRESS DATA RECORDING REGION FORMED WITH PAIRED WOBBLING SECTIONS OF IDENTICAL PHASE

(75) Inventors: Koichi Iida, Kawasaki (JP); Mineo Moribe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 11/044,977

(22) Filed: Jan. 27, 2005

(65) Prior Publication Data
US 2005/0128933 A1    Jun. 16, 2005

Related U.S. Application Data

(63) Continuation of application No. PCT/JP03/03555, filed on Mar. 24, 2003.

(30) Foreign Application Priority Data
Dec. 24, 2002  (JP) .............................. 2002-371760

(51) Int. Cl.
    *G11B 7/24* (2006.01)
(52) U.S. Cl. .................. 369/277; 369/275.4; 369/44.13
(58) Field of Classification Search ........................ None
    See application file for complete search history.

(56) References Cited

U.S. PATENT DOCUMENTS

| | | | |
|---|---|---|---|
| 4,942,565 A | 7/1990 | Lagadec | |
| 5,270,998 A * | 12/1993 | Uchiumi | 369/277 |
| 5,517,485 A | 5/1996 | Nishiuchi et al. | |
| 5,848,050 A * | 12/1998 | Nagasawa et al. | 369/275.4 |
| 6,292,458 B1 * | 9/2001 | Eguchi et al. | 369/275.3 |
| 6,728,197 B2 | 4/2004 | Miyamoto et al. | |
| 6,791,920 B1 | 9/2004 | Ko et al. | |
| 2001/0028613 A1 | 10/2001 | Okamoto et al. | |

FOREIGN PATENT DOCUMENTS

| | | |
|---|---|---|
| JP | 63-87655 | 4/1988 |
| JP | 5-314538 | 11/1993 |
| JP | 6-333240 | 12/1994 |
| JP | A 11-288554 | 10/1999 |
| JP | A 2001-297445 | 10/2001 |
| JP | A 2002-190118 | 7/2002 |
| KR | 2001-0049237 | 6/2001 |

* cited by examiner

*Primary Examiner*—Joseph Feild
*Assistant Examiner*—Tawfik Goma
(74) *Attorney, Agent, or Firm*—Fujitsu Patent Center

(57) ABSTRACT

An optical disk (D) is provided with multiple grooves (G) and multiple lands (L) alternating with each other. The address data recording regions have a pair of wobbling sections (31a, 31b) formed on both sidewalls of a groove (G) and having an identical phase. Thus, it is possible to obtain push-pull signals having a larger amplitude, which is advantageous for increasing the data recording density.

11 Claims, 9 Drawing Sheets

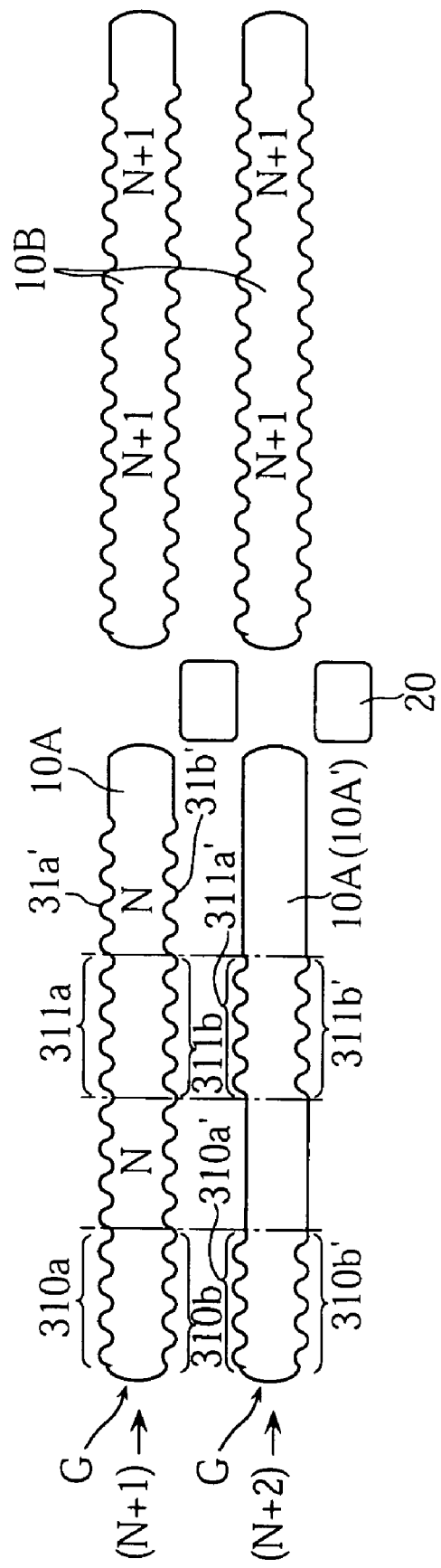

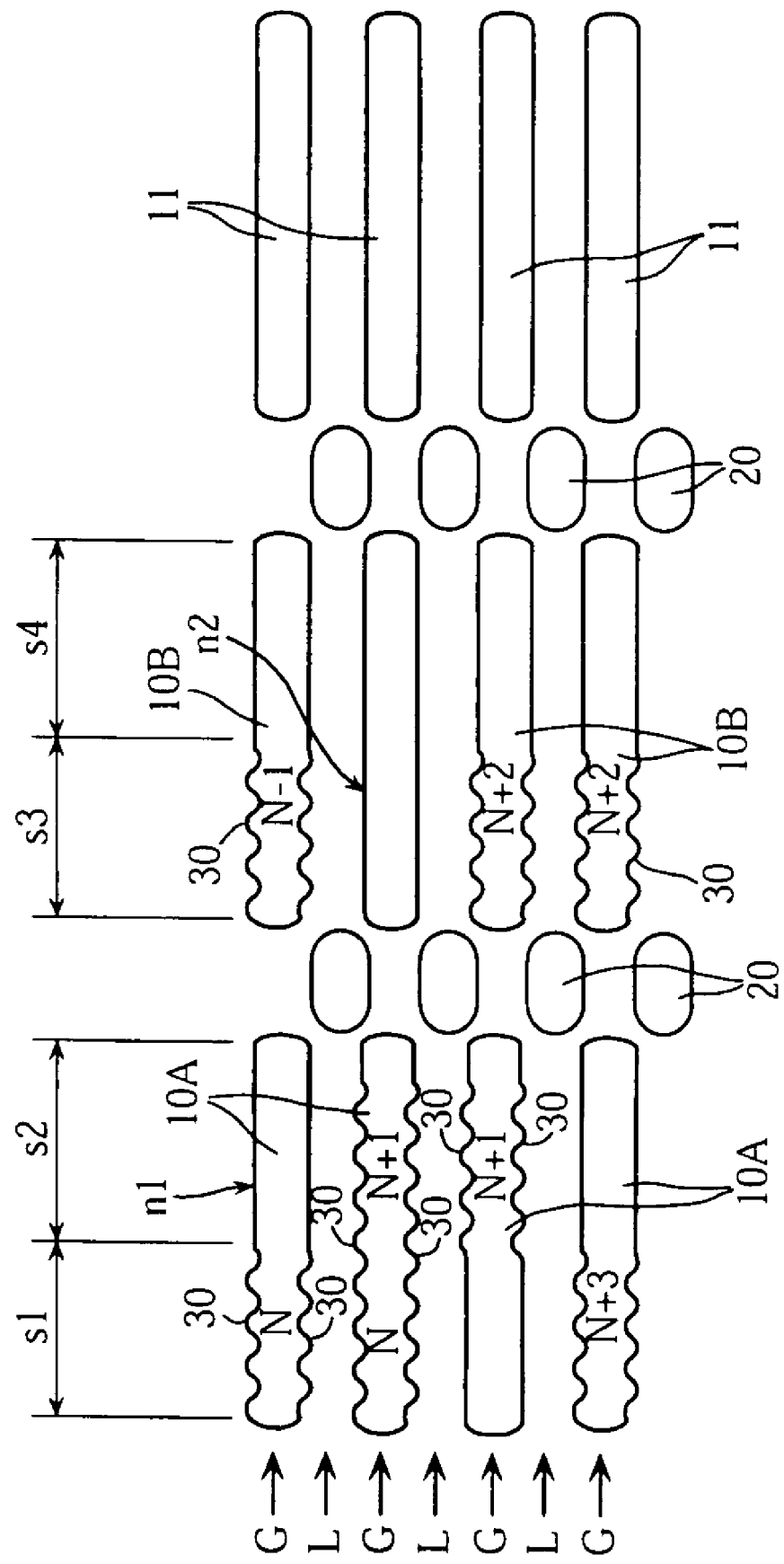

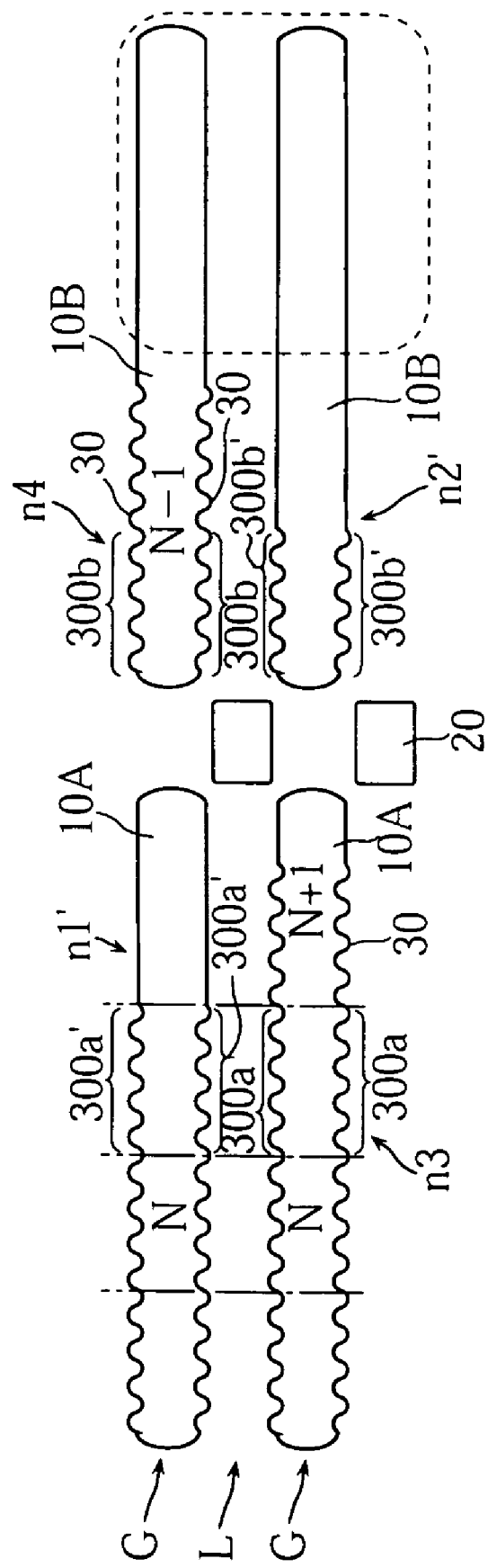

Groove G(N)
Land L(N)
Groove G(N+1)
Land L(N+1)
Groove G(N+2)
Land L(N+2)

OPTICAL DISK INCLUDING ADDRESS DATA RECORDING REGION FORMED WITH PAIRED WOBBLING SECTIONS OF IDENTICAL PHASE

This is a continuation of International PCT Application No. PCT/JP2003/003555 filed Mar. 24, 2003.

TECHNICAL FIELD

The present invention relates to an optical disk. "An optical disk" in this specification means a disk for recording and/or reproducing data using an optical means and covers a broad sense of disks on which data can be written in a magneto optical recording system, a phase modulation system, or an organic dye modulation system, in addition to a narrow sense of disks such as read only CD-ROMs.

BACKGROUND ART

Higher density optical disks have been developed. For example, one standard magneto optical disk is an AS-MO (Advanced Storage Magneto Optical Disk), which has a memory capacity of approximately 6 GB on one side of a diameter of 120 mm. This magneto optical disk has grooves G and lands L provided alternately in the radial direction (the arrow direction Ra) to form tracks as shown in FIG. 7. Each track has areas on which to form multiple fine clock marks 70 at a regular interval in the circumferential direction of the magneto optical disk. Each track is divided into multiple segments by these areas. The multiple segments are either address segments 8 or data segments 9. A frame comprises an address segment 8 and 38 data segments 9. The data segments 9 is an area for the user to record data in a magneto optical recording system while the address segment 8 is an area in which to store address data such as a track address.

The recording areas of a magneto optical disk are sectioned into multiple bands B (zones) as shown in FIG. 8. Multiple frames are aligned in the radial and circumferential directions in each band. A cycle of frames 1 to 9 is repeatedly arranged in the circumferential direction as shown in FIG. 9. Multiple frames aligned in the radial direction have the same frame number (frame address) in each band B. Address data stored in the address segments 8 shown in FIG. 7 include frame, band, and track addresses.

The so-called wobbling system is used for recording the address data in the address segments 8, in which wobbling sections 80 are provided on one of the sidewalls of the grooves G. Here, the morphology of wobbling sections 80 is schematically shown in the figure. The same is true for the other attached drawings FIGS. 1 to 6, described later. Two wobbling sections 80a and 80b are provided in the disk circumferential direction on a single address segment 8 for the track addresses N, (N+1), or (N+2) of the grooves G among the address data for the purpose of accurate reading. These two wobbling sections 80a and 80b are provided on a pair of sidewalls separately in a staggered manner. With the staggered manner, when the magneto optical disk is tilted and, consequently, it is difficult to detect one of the two wobbling sections 80a and 80b, the other one can be detected and the address data is reliably obtained.

The push-pull technique is used for reading the address data described above. The push-pull technique is hereafter briefly described. First, as shown in FIG. 10, a laser beam focused by an objective lens 6 illuminates the ridged surface formed by the lands L and grooves G, producing plus and minus reflected/diffracted lights R1. Consequently, the objective lens 60 receives the reflected/diffracted lights R1 in addition to the direct reflected light R0. These returning lights are given to a two-division detector 61 having two light receiving areas 61a and 61b. The difference between signals SG1 and SG2 output from the detector 61 and correspond to the received light amounts at the two light receiving areas 61a and 61b, respectively, is calculated. This is a push-pull signal. The wobbling rate at the laser beam illuminated section among the wobbling sections can be determined based on the push-pull signal.

The magneto optical disk pattern having the address segments 8 and data segments 9 described above is formed by rotating a glass master disk with a photo-resist applied and, concurrently, moving a laser beam focused by an objective lens in the radial direction to expose the disk to light, and then developing it. During exposure, one laser beam is divided into two and one of the two beams is controlled to wobble while exposing the parts corresponding to the wobbling sections 80. In this way, a groove G wobbled on one of the sidewalls and not wobbled on the other sidewall is obtained.

However, the prior art has the following problems.

First, an AS-MO standard magneto optical disk has a track pitch of 0.6 μm. Around this pitch, the wobbling sections 80 can be properly formed on one of the sidewalls of the groove G by means of the two-laser beam technique described above. However, when an attempt is made to reduce the track pitch to as small as 0.3 μm for the purpose of increasing the data recording density, it is difficult to properly form the wobbling sections 80 on the groove G by means of the two-laser beam technique. This is because the two beams increasingly overlap each other and become substantially a single beam spot as the distance between their beam spot centers is reduced.

Secondly, an AS-MO standard magneto optical disk utilizes a red laser having a wavelength of approximately 650 nm. Conversely, in order to produce magneto optical disks with higher densities, it is desirable to use a blue laser having a smaller wavelength (for example a wavelength of approximately 405 nm) for minimizing the beam spot. However, the detector is less sensitive to the blue laser than to the red laser. There may be an increasing risk that the wobbling sections 80 are not accurately detected. Particularly, separate optical detectors are used for detecting magneto optical signals and for detecting servo signals in the optical detection system of a magneto optical disk device. Therefore, a smaller amount of light is used for detecting the wobbling sections 80, which tends to cause inaccurate detection. Furthermore, in order to improve the S/N ratio of magneto optical signals, a smaller amount of light should be used for the servo operation and a larger amount of light should be used for detecting magneto optical signals. This will enhance the tendency above.

DISCLOSURE OF THE INVENTION

The purpose of the present invention is to provide an optical disk that can resolve or reduce the above problems.

The optical disk of the present invention has multiple grooves and multiple lands provided alternately in the disk radial direction and wobbling address data recording regions formed on the multiple grooves, characterized by the fact that the address data recording regions comprises a pair of wobbling sections having an identical phase formed on both sidewalls of the groove.

Preferably, adjacent grooves in the disk radial direction of the multiple grooves have a pair of wobbling sections having an identical phase and the lands have a section flanked by the pair of wobbling sections.

Preferably, the address data recording regions formed on the multiple grooves comprises a first recording region indicating the individual address of a groove and a second recording region indicating the address of another groove adjacent to the groove, and the multiple grooves are arranged in a manner in which the first recording region of a groove and the second recording region of another groove adjacent to the groove face each other with an intervening land and their wobbling sections have an identical phase.

Preferably, the first and second recording regions of multiple grooves are staggered in the disk circumferential direction between the grooves adjacent to each other in the disk radial direction, and the regions where the first and second recording regions face to each other with an intervening land are not adjacent to each other in the disk radial direction.

Preferably, the multiple grooves are arranged in a manner in which the first to third grooves are repeatedly aligned in the disk radial direction and have a non-track address region where track address data recording is prevented, wherein the first groove comprises a region indicating the track address of the first groove, a non-track address region, and a region indicating the track address of the third groove adjacent to the first groove, arranged in the disk circumferential direction in this order, the second groove comprises a region indicating the track address of the adjacent first groove, a region indicating the track address of the second groove, and a non-track address region, arranged in the disk circumferential direction in this order, and the third groove comprises a non-track address region, a region indicating the track address of the adjacent second groove, and a region indicating the track address of the third groove, arranged in the disk circumferential direction in this order.

Preferably, the non-track address region has an additional wobbling section indicating data different from that of the track address.

Preferably, the information indicated by the additional wobbling section is information common to the adjacent grooves.

Preferably, the additional wobbling sections are provided to adjacent grooves in the disk radial direction, respectively, and the pair of additional wobbling sections face each other with an intervening land and have an identical phase.

Preferably, the first to third grooves have indicator data that indicate which track address is the track address of the groove among the track address data obtained from the groove.

Preferably, the indicator data are stored by a pair of wobbling sections provided on both sidewalls of the groove and having an identical phase.

Preferably, the indicator data are stored at the beginning of a frame region comprising the first to third grooves.

Preferably, the multiple grooves and lands include multiple segments divided by multiple clock marks forming regions provided at a regular intervals in the disk circumferential direction on at least one and the same track.

Preferably, the multiple segments are address segments and multiple data segments used by the user and the wobbling address data recording region is formed on the multiple address segments.

Preferably, the multiple address segments have in part a region where the address data recording region is not formed and where data can be written as a part of the user data region.

Other characteristics and advantages of the present invention will be apparent upon reading the following explanation of the embodiments of the invention.

BRIEF DESCRIPTION OF THE DRAWINGS

FIG. 2 is a schematic plan view of the core showing another embodiment of the pattern on the recording surface of the optical disk of the present invention.

FIG. 3 is a schematic plan view of the core showing another embodiment of the pattern on the recording surface of the optical disk of the present invention.

FIG. 4 is a schematic plan view of the core showing another embodiment of the pattern on the recording surface of the optical disk of the present invention.

BEST MODE FOR CARRYING OUT THE INVENTION

Preferred embodiments of the present invention are described hereafter, with reference to the drawings.

Figure 1A:
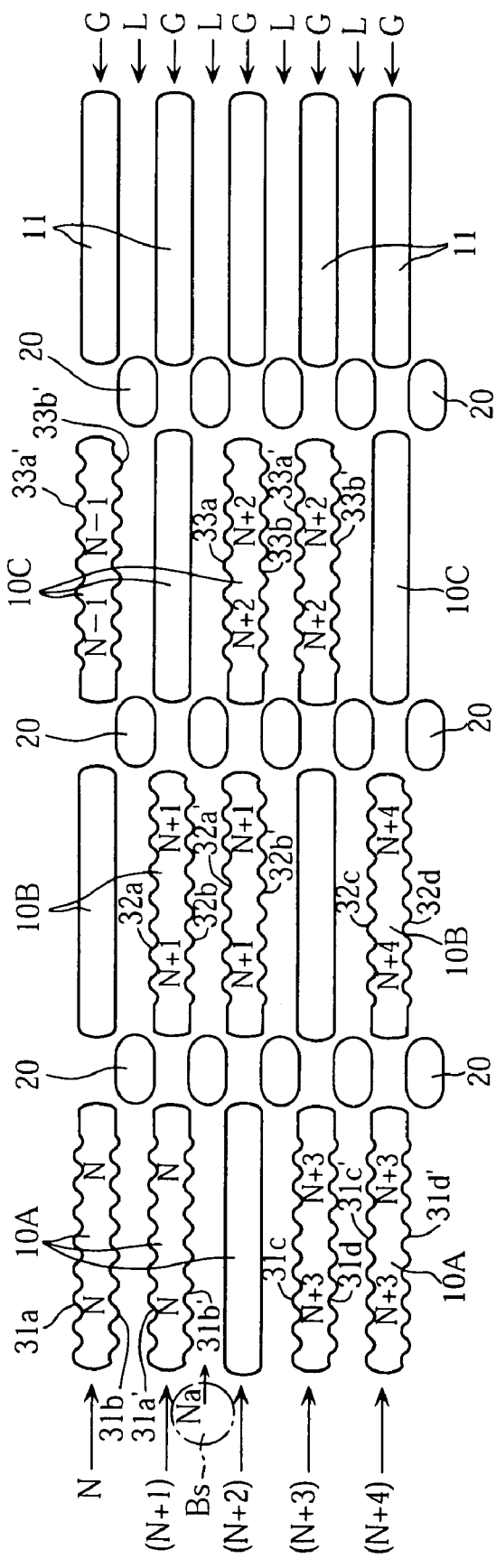
FIG. 1A is a schematic plane view of the core showing an embodiment of the pattern on the recording surface of the optical disk of the present invention and FIG. 1B is an illustration showing an embodiment of signals obtained when the optical disk lands are illuminated with a beam spot.

FIG. 1A shows a pattern on the recording surface of a magneto optical disk to which the present invention is applied. The magneto optical disk D of this embodiment uses a so-called land/groove recording system in which multiple grooves G and lands L are arranged in the radial direction (the arrow direction Ra) as recording tracks. Unlike this embodiment, only one of them, the grooves G or the lands L, can be used as recording tracks.

The grooves G have first to third address segments 10A to 10C and multiple data segments 11, which are aligned in the disk circumferential direction with fine clock marks 20 in-between. The magneto optical disk D of this embodiment is characterized by the structure of the first to third address segments 10A to 10C; it has otherwise a similar structure to a prior art known magneto optical disk. Therefore, the following explanation will focus on the structure of the first to third address segments 10A to 10C.

The first to third address segments 10A to 10C of the magneto optical disk D have so-called double wobbled address data recording regions.

Specifically, the N-th groove G has wobbling sections 31a and 31b on both sidewalls of the first address segment 10A. The wobbling sections 31a and 31b are wobbled in the same direction, having an identical phase. The wobbling sections 31a and 31b each indicate one and the same address data. The address data is data modulated by a proper technique. The address data include a frame address, a band address, and a track address. The track address indicated by the wobbling sections 31a and 31b is N. The track address N is stored twice on one address segment 10A. Frame addresses and band addresses are common to data in one and the same frame and one and the same band; therefore, reading errors can be reduced. However, the track address is repeated twice so as to prevent wrong detections. With this point, other wobbling sections provided on the first to third address segments 10A to 10C are the same.

Wobbling sections 33a' and 33b' are formed on both sidewalls of the third address segment 10C of the N-th groove G. The wobbling sections 33a' and 33b' are also wobbled in an identical phase to each other. The wobbling sections 33a' and 33b' indicate a track address (N−1) that is the preceding address to the N-th groove G on which they are formed.

In this way, the N-th groove G has the wobbling sections 31a and 31b that indicate the track address of the own groove G and the wobbling sections 33a' and 33b' that indicate the track address of an adjacent groove. The second address segment 10B of this groove G is a non-address data region.

The (N+1)-st groove G has wobbling sections 31a', 31b', 32a, and 32b on both sidewalls of the first and second address segments 10A and 10B. The wobbling sections 31a' and 31b' have the identical wobbling to that of the wobbling sections 31a and 31b of the N-th groove G, indicating the track address N. The wobbling sections 32a and 32b are wobbled in an identical phase to each other, indicating the track address (N+1). The third address segment 10C of this groove G is a non-address data region.

The (N+2)-nd groove G has wobbling sections 32a', 32b', 33a, and 33b on both sidewalls of the second and third address segments 10B and 10C. The wobbling sections 32a' and 32b' have the identical wobbling to that of the wobbling sections 32a and 32b, indicating the track address (N+1). The wobbling sections 33a and 32b are wobbled in an identical phase to each other, indicating the track address (N+2). The first address segment 10A of this groove G is a non-address data region.

The address segments of the (N+3)-rd and succeeding grooves G repeatedly have essentially the same structure as the group of three, the N-th, (N+1)-st, and (N+2)-nd, grooves G. Hence, the (N+3)-rd groove G has the wobbling sections 31c and 31d of an identical phase on both sidewalls of the first address segment 10A, indicating the address data (N+3), and the wobbling sections 33a' and 33d' that has the identical phase to that of the wobbling sections 33a and 33b of the (N+2)-nd groove G on both sidewalls of the third address segment 10C. The (N+4)-th groove G has the wobbling sections 31c' and 31d' that has the identical phase to that of the wobbling sections 31c and 31d on both sidewalls of the first address segment 1A, indicating the address data (N+3), and the wobbling sections 32c and 32d on both sidewalls of the second address segment 10B, indicating the address data (N+4).

The efficacy of the magneto optical disk D is described hereafter.

When a groove G is illuminated with a beam spot to read address data, two track addresses are obtained. Specifically, for example for the N-th groove G, the track address N is obtained from the wobbling sections 31a and 31b and the track address (N−1) is obtained from the wobbling sections 33a' and 33b'. The magneto optical disk device is provided with a control circuit for obtaining the address data of a groove G, which selects for the larger track address as the track address of the groove. Therefore, among N and (N−1), the larger one N is correctly selected as the track address of the N-th groove G. For the grooves G other than the N-th, the track address can be correctly obtained in a similar manner.

Figure 10:
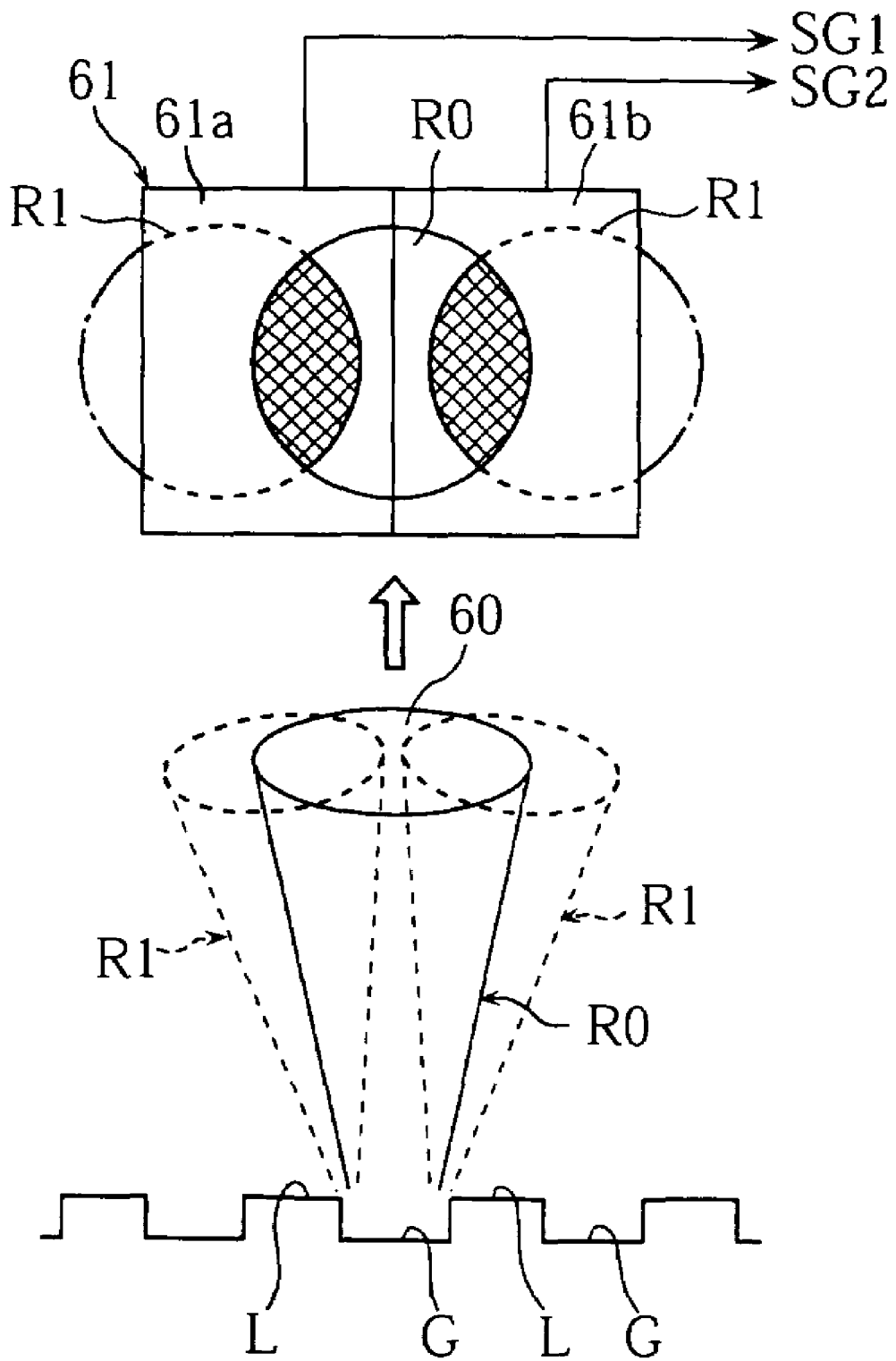
FIG. 10 is an illustration which explains the push-pull technique.

When the first address segment 10A of the N-th groove G is illuminated with a beam spot to obtain the address data, the reflected light is obtained from two wobbling sections 31a and 31b. These two wobbling sections 31a and 31b are wobbled in an identical phase to each other. For example, compared with the case where only one of these two is formed, the total wobbling rate is doubled. Therefore, the wobbling detection signals (push-pull signals) detected in the push-pull technique explained with reference to FIG. 10 have approximately doubled amplitudes. This can lead to the improved accuracy of wobbling detection, or to the accuracy of data reading. The address segments indicating address data of the magneto optical disk D consist of two wobbling sections having an identical phase. The same efficacy as described above can be obtained for reading the address of any groove G.

If the address data detection accuracy is improved based on the principle above, the optical detection system of the magneto optical disk device will not need a larger amount of light for servo operation. Instead, a larger amount of light can be used for detecting magneto optical signals to read data from the data segments 11, whereby increasing the S/N ration of magneto optical signals. As described above, when the blue laser is used as a laser beam for reading/writing data, instead of the red laser, the optical detector tends to exhibit less sensitivity. On the other hand, the magneto optical disk D of this embodiment exhibits improved sensitivity in detecting the address data. Therefore, it is suitable for future generation magneto optical disk devices using a blue laser.

For producing the magneto optical disk D, two wobbling sections should be formed on both sidewalls of each address segment. These two wobbling segments have an identical phase; therefore, they can be formed by a single laser beam technique. This is preferable for increasing data recording densities with smaller track pitches.

With the magneto optical disk D, the address data of the lands L can also be correctly obtained as described hereafter.

Figure 1B:
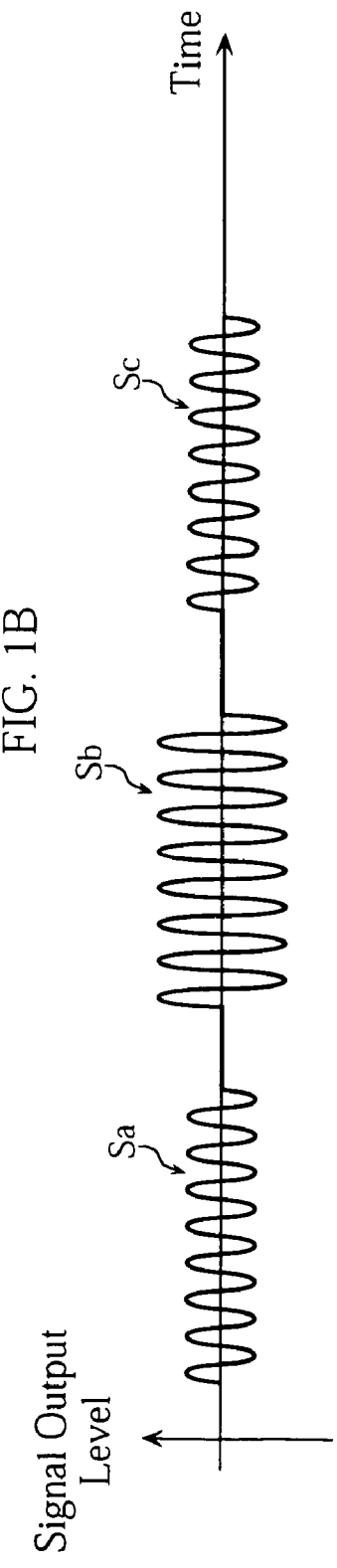

As a beam spot shown in FIG. 1A is moved along a land L in the arrow direction Na, the wobbling sections 31b', 32b, 32a', and 33a, which are formed on two grooves G flanking this land, are sequentially read. In this case, the wobbling sections 32b and 32a' correctly indicating the track address of the land L have an identical phase and concurrently read, producing the detection signals with a larger amplitude as marked Sb in FIG. 1B. Conversely, the wobbling sections 31b' and 33a are each present only one side of the land L and there is no wobbling sections across the land L from them. Therefore, their detection signals have a smaller amplitude as marked Sa and Sc, which is approximately half that of the signals' marked Sb. In the course of processing the detection signals Sa to Sc, a threshold for removing the signals Sa and Sc can be used to correctly extract the signals Sb. Based on these, the track address data of the land L can be correctly obtained. With the magneto optical disk D, any of the multiple lands L has two wobbling sections having an identical phase and correctly indicating the address of a land L. Hence, the address is correctly obtained for any land L.

FIGS. 2 to 5 show other embodiments of the present invention. In these figures, the same or similar elements as or to of the embodiment above are given the same reference numbers as that of the embodiment above.

Two each of address segments 10A and 10B shown in FIG. 2 correspond to the first and second address segments 10A and 10B of the (N+1)-st and (N+2)-nd grooves G shown in FIG. 1. The difference is that the first address segment 10A of the (N+2)-nd groove G in FIG. 1 has no wobbling sections while the corresponding address segments 10A (10A') of this embodiment have wobbling sections 310a' and 310b' and wobbling sections 311a' and 311b' on both sidewalls.

The two wobbling sections 31a' and 31b' of the first address segment 10A of the (N+1)-st groove G include wobbling sections 310a and 310b indicating preamble, sync, frame address, and band address data. The wobbling sections 31a' and 31b' further include wobbling sections 311a and 311b indicating, repeated preamble and re-sync. The remaining part of the wobbling sections 31a' and 31b' indicate a track address and CRC data for error checking. The wobbling sections 310a' and 310b' have identical contents to those of the wobbling sections 310a and 310b, having an identical phase to theirs'. The wobbling sections 311a' and 311b' have identical contents to those of the wobbling sections 311a and 311b, having an identical phase to theirs'.

With this structure, data including preamble being added to the first address segment 10A (10A') of the (N+2)-nd groove G, the start position of a frame is more clear compared with the embodiment shown in FIG. 1A. In the present invention, the address segments where a track address does not need to be stored can be used to store data other than track addresses and CRCs. With the structure shown in FIG. 1A, some second and third address segments 10B and 10C have no wobbling sections. Needless to say, they can be provided with the wobbling sections indicating common data other than track addresses and CRCs.

With the structure shown in FIG. 3, a groove G has only first and second address segments 10A and 10B. With this structure, there is no segment corresponding to the third address segment 10C of the embodiments shown in FIG. 1A. The first address segment 10A is divided into a left region s1 and a right region s2 in the figure. An address data wobbling section 30 containing the track address N, (N+1), (N+2), or (N+3) is provided to both or one of these two regions s1 and s2 as appropriate. Conversely, the second address segment 10B has a left region s3, which is an only region indicating an address data and provided with a wobbling section 30 as appropriate. The wobbling sections 30 indicate one and the same track address only one time, not repeating it twice. In this point, the present embodiment differs from the embodiment shown in FIG. 1A.

For reading data by illuminating a magneto optical disk with a laser beam, the transparent substrate of the magneto optical disk is illuminated with the laser beam so that the light transmitted through the transparent substrate reaches the recording surface, or the recording surface is illuminated with the laser beam through a transparent protective coating having a small thickness and provided on the opposite side to the transparent substrate. The so-called double wobbling technique of the present invention is less influenced by tilting compared with the prior art, so-called single wobbling technique.

Using the latter technique described above, the influence of tilting of the magneto optical disk during the data reading can be further reduced. Therefore, the track addresses can be correctly obtained even through they are not repeated twice. The structure shown in FIG. 3 is suitable for introducing this technique.

In the embodiment shown in FIG. 3, one and the same track address is not repeated on a track and only the first and second address segments 10A and 10B are provided.

Therefore, the total number of address segments is reduced and address data regions are cut back. This leads to increasing of user data regions. Particularly, the right region s4 of the second address segment 10B can be used as magnetic recording data regions similarly to the data segments 11. Thus, it preferably improves the format efficiency and increase the data storage capacity.

In FIG. 3, for example the right region s2 of the first address segment 10A that is marked n1 and the left region s3 of the second address segment 10b that is marked n2 have no wobbling sections. In the present invention, as explained with reference to FIG. 2, those regions may have wobbling sections indicating preamble and other data. Specifically, for example as shown in FIG. 4, corresponding to the address segments above, the address segments 10A and 10B marked n1' and n2' have wobbling sections 300a' and 300b'. The wobbling section 300a' has the identical phase to that of the wobbling section 300a that is marked n3 and indicates repeated preamble and re-sync data contained in the wobbling section 30 of the adjacent address segment 10A. The wobbling section 300b' has the identical phase to that of the wobbling section 300b that is marked n4 and indicates preamble, sync, frame address, and band address data contained in the wobbling section 30 of the adjacent address segment 10B. This structure also facilitates the recognition of the beginning of a frame for reading data.

Figure 5:
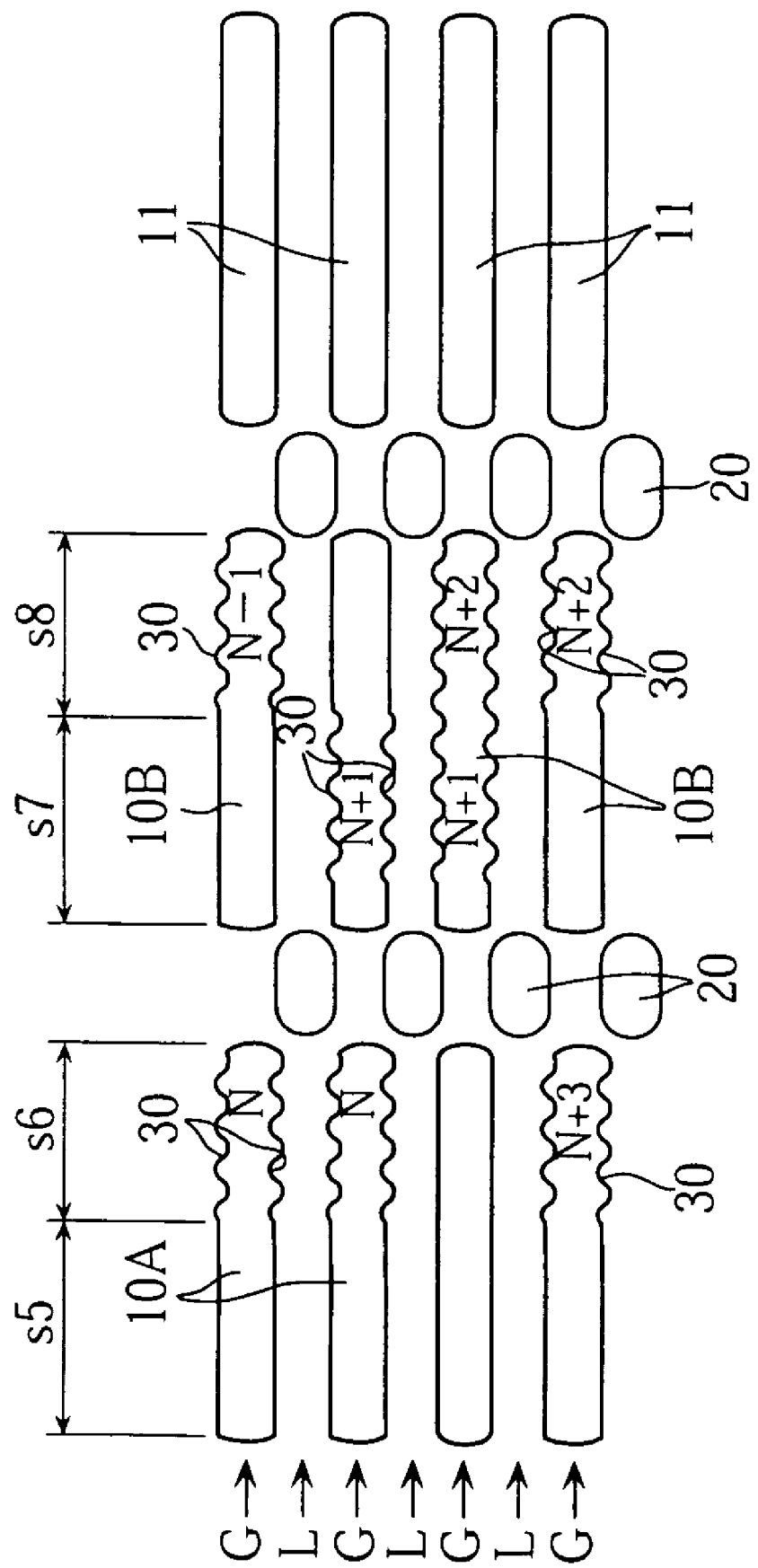
FIG. 5 is a schematic plan view of the core showing another embodiment of the pattern on the recording surface of the optical disk of the present invention.
Figure 6A:
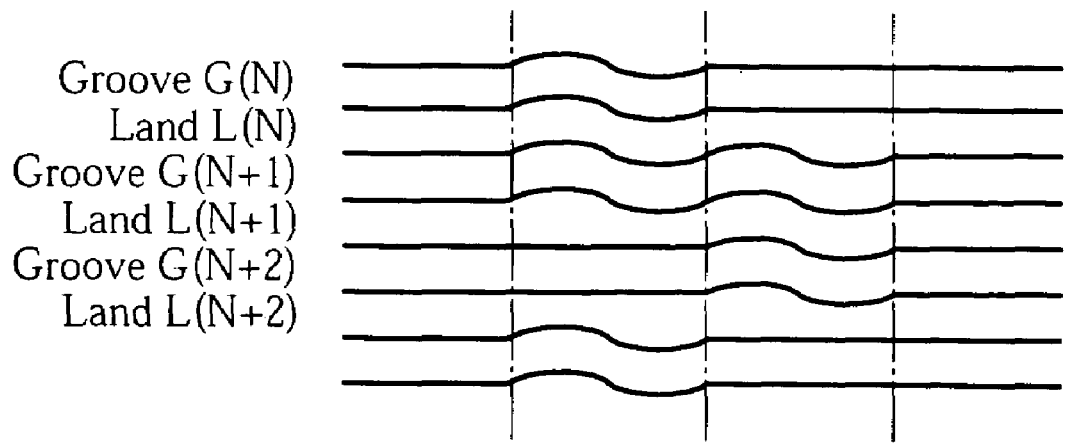
FIG. 6A is a plane view of the core showing another embodiment of the grooves and lands and FIG. 6B is an illustration showing an embodiment of signals obtained by the patter shown in FIG. 6A.
Figure 6B:
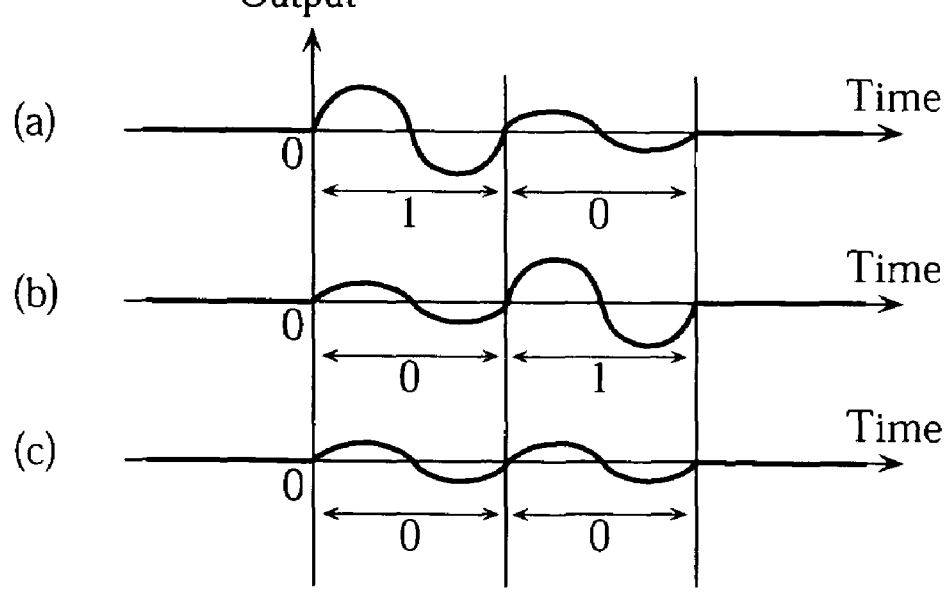
Figure 7:
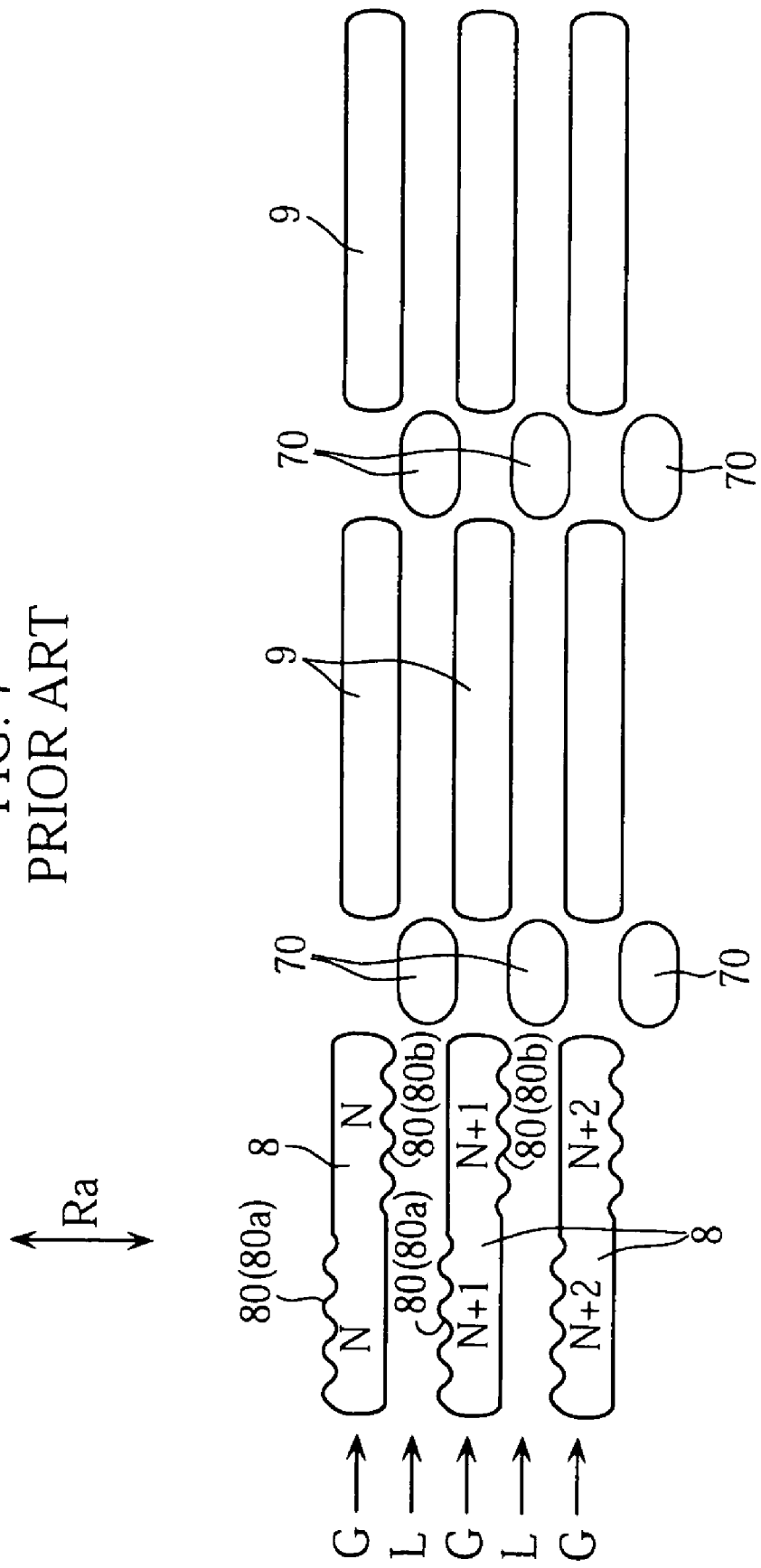
FIG. 7 is a plane view of the core showing a prior art embodiment.
Figure 8:
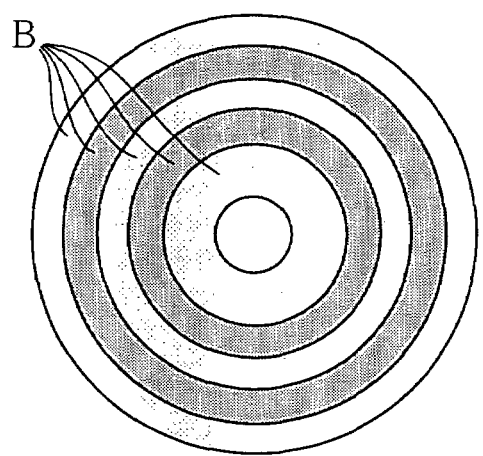
FIG. 8 is an illustration which explains the bands of a magneto optical disk.
Figure 9:
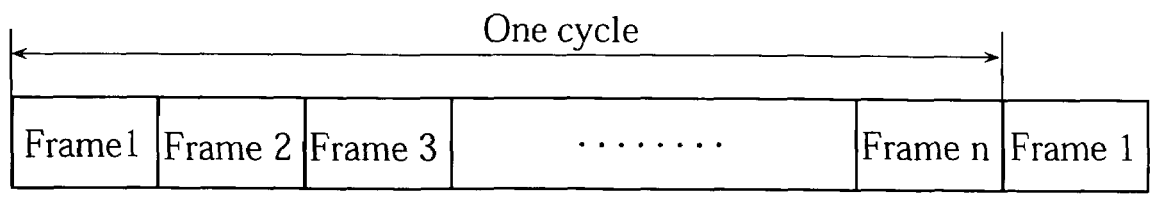
FIG. 9 is an illustration showing an array of multiple frames.

With the structure shown in FIG. 5, the right region s6 of the first address segment 10A and the left and right regions s7 and s8 of the second address segment 10B have wobbling sections 30 in a regular pattern. Among these wobbling sections 30, those facing to each other have an identical phase as in the previous embodiment. The left region s5 (the start region) of the first address segment 10A has a pattern shown in a plan view of FIG. 6A. The pattern shown in the figure produces push-pull signals having the waveforms shown in FIG. 6A (a) to (c) as a beam spot pass through the N-th, (N+1)-st, and (N+2)-nd lands L (N), L (N+1), and L (N+2). Among the sections shown in FIG. 6A, the wobbling sections having an identical phase produce push-pull signals having a larger amplitude than the other sections. Here, among the push-pull signals shown in FIG. 6B (a) to (c), the signals having a larger amplitude are indicated by "1" and the signals having a smaller amplitude are indicated by "0." The land L (N) produces signals (1, 0); the land L (N+1), signals (0, 1); and the land L (N+1), signals (0, 0). These signals serve to distinguish the lands L (N), L (N+1), and L (N+2) from one another. Therefore, it can be determined which track address is taken among the track addresses obtained by means of the lands L.

Specifically, with the structure shown in FIG. 5, as a beam spot pass through the sections of the land L (N), the three track addresses, N, (N+1), and (N−1), are sequentially obtained. A rule is made that the first track address obtained is taken when the signals described above are detected. In this way, the second and third addresses, (N+1) and (N−1), are not mistakenly taken. Similarly, a rule can be made based on the signals above that the second address obtained is taken for the land L (N+1) and the third address obtained is taken for the land L (N+2). As described above, when the wobbling section is provided only on one side of a land L, the push-pull signals have a smaller amplitude; therefore, it is prevented from being taken as a correct track address. The technique described above being additionally used, the risk of detecting a wrong track address is surely eliminated.

The present invention is not restricted to the contents of the embodiments described above. The specific structure of each sections of the optical disk of the present invention can be designed and modified on an arbitrary basis.

In the present invention, the number of the address segments provided on a track or a land is not limited to two or three. For example, only one address segment may be provided and, there, wobbling sections indicating multiple track addresses such as N, (N+1), and (N+2) are formed in the disk circumferential direction.

The optical disk of the present invention is not restricted to a magneto optical disk as understood from the definition in the preamble. The present invention is applicable to a variety of disks where wobbling is used for recording address data.

The invention claimed is:

1. An optical disk having multiple grooves and multiple lands arranged alternately in the disk radial direction and wobbling address data recording regions formed on said multiple grooves, wherein said address data recording regions comprises a pair of wobbling sections having an identical phase formed on both sidewalls of said groove, wherein adjacent grooves in the disk radial direction of said multiple grooves have a pair of wobbling sections having an identical phase, and said lands have a section flanked by said pair of wobbling sections, wherein said address data recording regions formed on said multiple grooves have a first recording region indicating the individual address of a groove and a second recording region indicating the address of another groove adjacent to said groove, said multiple grooves are arranged in a manner in which said first recording region of a groove and said second recording region of another groove adjacent to said groove face each other with an intervening land, and their wobbling sections have an identical phase, wherein said first and second recording regions of multiple grooves are staggered in the disk circumferential direction between the grooves adjacent to each other in the disk radial direction, and the regions where said first and second recording regions face to each other with an intervening land are not adjacent to each other in the disk radial direction, wherein said multiple grooves are arranged in a manner in which first to third grooves are repeatedly provided in the disk radial direction and have a non-track address region where track address data recording is prevented, wherein said first groove comprises a region indicating the track address of said first groove, a non-track address region, and a region indicating the track address of the third groove that is adjacent to said first groove, arranged in the disk circumferential direction in this order, wherein said second groove comprises a region indicating the track address of the adjacent first groove, a region indicating the track address of said second groove, and a non-track address region, arranged in the disk circumferential direction in this order, and wherein said third groove comprises a non-track address region, a region indicating the track address of the adjacent second groove, and a region indicating the track address of said third groove, arranged in the disk circumferential direction in this order.

2. The optical disk according to claim 1, wherein said non-track address region has an additional wobbling section indicating data different from the track address.

3. The optical disk according to claim 2, wherein the information indicated by said additional wobbling section is information common to adjacent grooves.

4. The optical disk according to claim 3, wherein said additional wobbling sections are provided to adjacent grooves in the disk radial direction, respectively, and said pair of additional wobbling sections face each other with an intervening land and have an identical phase.

5. The optical disk according to claim 1, wherein said first to third grooves have indicator data that indicate which track address is the track address of the groove among the track address data obtained from the groove.

6. The optical disk according to claim 5, wherein said indicator data are stored by a pair of wobbling sections provided on both sidewalls of the groove and having an identical phase.

7. The optical disk according to claim 6, wherein said indicator data are stored at the beginning of a frame region comprising said first to third grooves.

8. The optical disk according to claim 1 wherein said multiple grooves and lands include multiple segments divided by multiple clock mark forming regions provided at a regular interval in the disk circumferential direction on at least one and the same track.

9. The optical disk according to claim 8, wherein said multiple segments are address segments and multiple data segments used by the user and the wobbling address data recording region is formed on said multiple address segments.

10. The optical disk according to claim 9, wherein said multiple address segments have in part a region where said address data recording region is not formed and data can be written as a part of the user data region.

11. An optical disk comprising:

multiple grooves having wobbling address data recording regions formed thereon;

multiple lands alternately arranged with the multiple grooves in a radial direction of the disk;

each of the wobbling address data recording regions include a pair of wobbling sections having an identical phase formed on both sidewalls of a groove;

the multiple grooves are arranged in a manner in which a first groove, a second groove and a third groove are repeatedly provided in the radial direction of the disk;

the first groove includes a region indicating the track address of said first groove, a non-track address region, and a region indicating the track address of the third groove that is adjacent to said first groove, arranged in a circumferential direction of the disk in this order;

the second groove includes a region indicating the track address of the adjacent first groove, a region indicating the track address of the second groove, and a non-track address region, arranged in the circumferential direction of the disk in this order; and the third groove includes a non-track address region, a region indicating the track address of the adjacent second groove, and a region indicating the track address of the third groove, arranged in the circumferential direction of the disk in this order.

* * * * *